Patented July 23, 1946

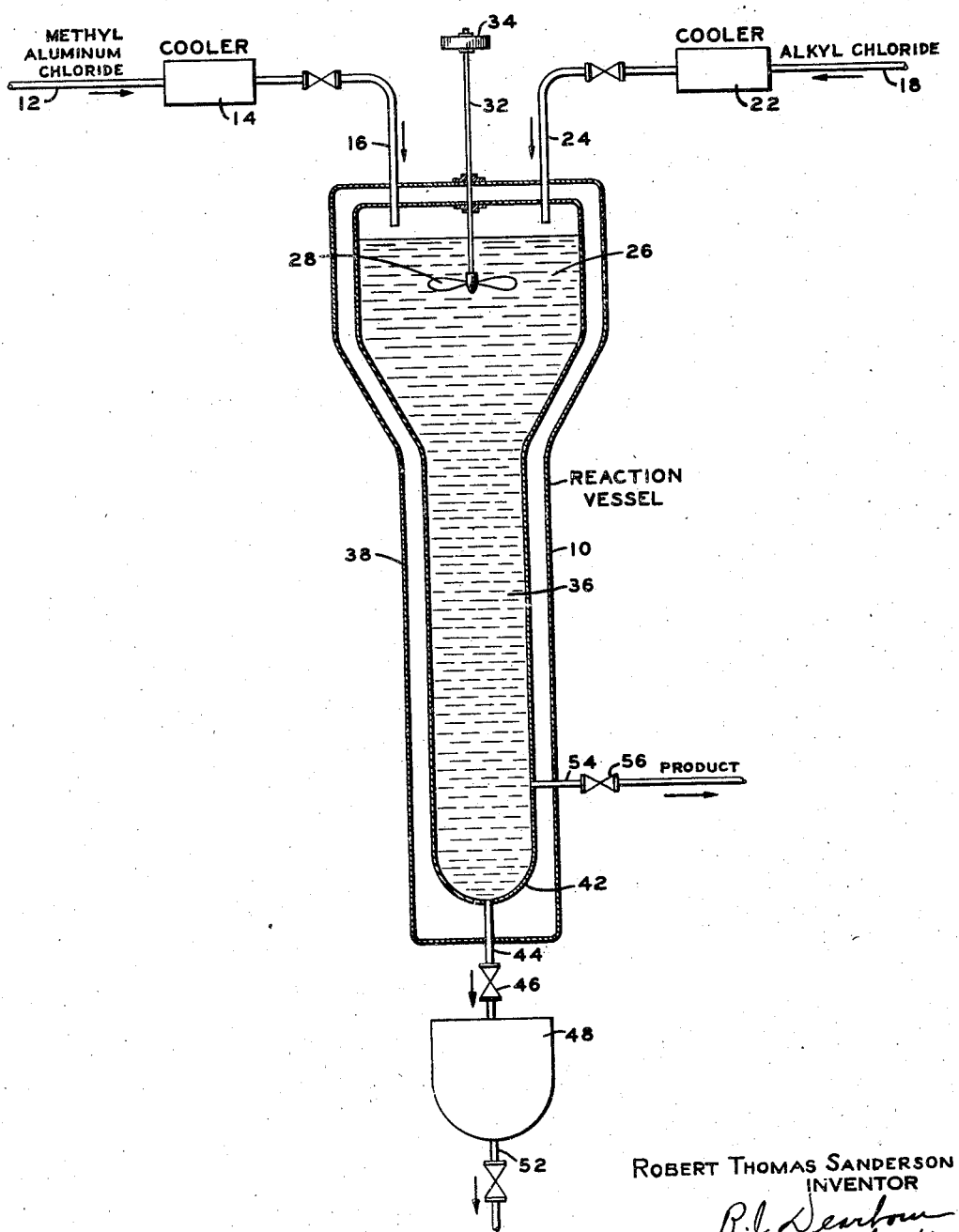

2,404,599

UNITED STATES PATENT OFFICE 2,404,599

SYNTHESIS OF PARAFFINIC HYDROCARBONS BY REACTING AN ALKYL ALUMINUM HALIDE WITH AN ALIPHATIC HALIDE

Robert Thomas Sanderson, Fishkill, N. Y., assignor to The Texas Company, New York, N. Y., a corporation of Delaware Application July 29, 1942, Serial No. 452,698

17 Claims. (Cl. 260—676)

This invention relates to the synthesis of organic compounds. The invention especially relates to an alkylation process which may be employed for the production of a valuable class of organic compounds.

In accordance with the invention valuable organic compounds are prepared efficiently by reacting an aliphatic halide, particularly an alkyl halide, such as an alkyl chloride, bromide or iodide, preferably a tertiary alkyl chloride with an alkyl aluminum halide in a reaction mixture in which the reactive materials consist essentially of the aliphatic halide and the alkyl aluminum halide. I have found that the reaction mixture should contain either these two materials and their reaction products alone, or, if another material is present, it should be substantially inert to the aliphatic halide, the alkyl aluminum halide, and products of the reaction such as aluminum halides. The reaction results in replacement of the halogen of the aliphatic halide by the alkyl radical of the alkyl aluminum halide to yield an alkylation product.

Thus, I have discovered that a methyl aluminum chloride, bromide or iodide can be reacted efficiently with an alkyl halide, such as 2-chloro-2,3-dimethylbutane, to produce a good yield of 2,2,3-trimethylbutane (triptane). When methyl aluminum chloride, which, as discussed below, is considered to be a mixture of methyl aluminum dichloride and dimethyl aluminum chloride, is used the desired reaction may be illustrated by the following equation:

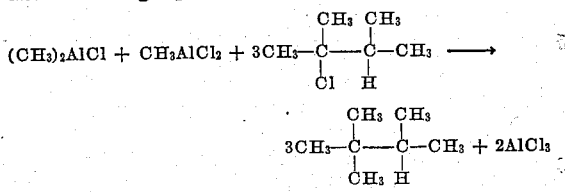

As previously indicated, in this process it is important to maintain the reaction mixture substantially free from reactive materials other than the two reactants and their reaction products. It appears that the methyl aluminum chloride and the aluminum chloride by-product are both highly active materials, and, while removing aluminum chloride from the zone of reaction by the addition of a compound reactive therewith to the mixture would seem to be an obvious desideratum, it appears that a compound which reacts with the aluminum chloride also interferes with the alkylation reaction, probably by reaction with the methyl aluminum chloride. Accordingly, if a solvent is used it should be inert and preferably should be a saturated hydrocarbon liquid, paraffinic or naphthenic in character. Preferred solvents are paraffinic hydrocarbon liquids which boil substantially above the boiling point of the desired product. When such liquids are used, the separation of the desired product by distillation is simplified.

As compared with other alkylation processes using metallo organic compounds, the present process is advantageous in that relatively cheap materials may be employed in a simple manner to give good yields of the desired products. For example, in Grignard reactions magnesium must be used and also ether usually must be employed as the solvent. In the present process the metal used is aluminum and either no solvent is used or a saturated hydrocarbon liquid may be used. Moreover, the alkyl aluminum halide preferably used in the present process is a chloride which may be prepared from a relatively inexpensive alkyl chloride, as described below.

Alkyl aluminum halides of the class which may be used in the present process have been described in the literature; see for example, Journal of the American Chemical Society, 60, 2276 (1938). In general they may be prepared by reacting aluminum, preferably in the form of an alloy also containing copper, with the corresponding alkyl halide, such as a methyl, ethyl or propyl halide, at atmospheric or higher pressures. In the case of methyl aluminum chloride, the aluminum may be reacted with methyl chloride by passing methyl chloride gas in contact with a finely divided aluminum alloy containing up to 10 per cent copper in the presence of a small amount of iodine and methyl iodide and/or some product from a previous reaction. Once the reaction starts it is highly exothermic and cooling is required to maintain the temperature at least below 50° C. The reaction proceeds satisfactorily at 0° C. The reaction is considered completed when the aluminum is used up or when the rate of reaction has slowed perceptibly. The reaction product contains dimethyl aluminum chloride and methyl aluminum dichloride.

In carrying out the present process in accordance with one manner of proceeding, the methyl aluminum chloride or other alkyl aluminum halide is placed in a suitable reaction vessel and then the selected aliphatic halide is introduced slowly. It has been found that this reaction proceeds best at temperatures below 0° C., preferably between —50° C. and 0° C. Therefore, the reaction mixture is cooled and to assure efficient cooling with avoidance of local overheating the mixture is preferably subjected to vigorous agitation. As suggested previously, the aluminum halide by-product, especially aluminum chloride, appears to interfere somewhat with continued reaction. In batch operation it is difficult to avoid permitting the aluminum chloride's coming into contact with the reactant. However, low temperatures seem to reduce the activity of this salt. In this connection it should be noted that when referring to a solvent which is inert to aluminum chloride a solvent is meant which is inert under the reaction conditions but not necessarily so under other more vigorous conditions.

In order that the invention may be understood more fully reference should be had to the following specific examples which illustrate processes carried out in accordance with the invention.

EXAMPLE 1

Part A 22.5 parts by weight of turnings of Duralumin (an alloy containing 93 per cent aluminum, 3.3 per cent copper, and 1.1 per cent magnesium) were placed in a closed reaction vessel, air was flushed out with methyl chloride, and then a small amount of iodine, methyl iodide, and product from a previous reaction were added. After the reaction started, methyl chloride was added in increments with cooling until the reaction upon further addition of methyl chloride proceeded slowly. At this point about three-fourths of the metal had been converted into the liquid reaction product.

Part B

To the reaction mixture prepared as described in Part A, 368 parts by weight of a 12.5 per cent solution of 2-chloro-2,3-dimethylbutane in 2,3-dimethylbutane were added slowly over a period of about three hours while maintaining the temperature at about 0° C. The resulting mixture was poured over ice, the water-hydrocarbon mixture was separated, and the hydrocarbon portion was washed with water and dried over anhydrous potassium carbonate. About 18 parts by weight of normal heptane were added as bottoms and the mixture was distilled in a fractionating column. The fraction boiling at 80 to 82° C. was separately collected (2,2,3-trimethylbutane boils at 80.9° C.). This fraction constituted about 20.5 parts by weight, or a yield of about 54 per cent based on the 2-chloro-2,3-dimethylbutane.

EXAMPLE 2

Part A

In this example, methyl aluminum chloride was prepared substantially as described in Example 1—Part A except that 10 parts by weight of turnings of an alloy identified as alloy No. 12 were used containing 91.5 per cent aluminum and 6 per cent copper. Also, the temperature was maintained at about −10° C. and the reaction was continued until about 80 per cent of the alloy had been consumed.

Part B

To the reaction mixture prepared as described in Part A, 265 parts of a solution of 2-chloro-2,3-dimethylbutane in 2,3-dimethylbutane of about 15.2 per cent concentration were slowly added over a period of two to three hours. During the addition the mixture was stirred vigorously and was cooled to a temperature of about 0° C. The reaction mixture was then poured over ice, treated with hydrochloric acid to dissolve any aluminum hydroxide formed, and water was added. The mixture formed two layers, and the hydrocarbon layer was separated, washed, and dried. It was then mixed with about 25 parts by weight of xylene and distilled. A fraction composed largely of 2,2,3-trimethylbutane was collected and constituted about a 45 per cent yield based on the 2-chloro-2,3-dimethylbutane.

It will be understood that the foregoing examples are merely representative of batch processes in accordance with the invention, and that other alkyl aluminum halides, such as ethyl and propyl compounds, and other aliphatic halides such as chlorine, iodine and bromine derivatives of butyl, amyl, hexyl and heptyl compounds can be used. The reaction proceeds especially well when a tertiary alkyl halide is used. As examples of suitable aliphatic halides there may be mentioned t-butyl chloride, 2-chloro-2-methylbutane, 2,2,3-trimethyl-2-chloropentane, 2,3-dimethyl-2-chloropentane and the corresponding bromides and iodides. Also, it will be understood that where an aliphatic halide or an alkyl halide is referred to, the di- and poly-halides as well as the monohalides are intended, unless otherwise indicated. For example, the invention includes processes as described in the foregoing examples involving the use in place of the 2-chloro-2,3-dimethylbutane of a compound such as an alkyl di-halide for reaction with an alkyl aluminum halide to replace both halogens with the alkyl radical of the alkyl aluminum halide. The invention also includes processes as described in the examples in which a product obtainable by halogenating a selected paraffinic fraction or an olefinic fraction, for example, a paraffinic or olefinic petroleum fraction containing predominantly compounds containing 4 to 8 carbon atoms, is reacted with an alkyl aluminum halide. Depending upon the composition of the fraction selected, a product consisting largely of a single branched-chain compound or consisting of a mixture of compounds containing one, two or more substituted alkyl groups may be obtained.

In place of the 2,3-dimethylbutane used as a solvent in the above examples, other saturated hydrocarbon liquids, such as isooctane, heptane, safety fuel, and paraffinic or naphthenic petroleum oils may be used. As pointed out above, by using higher boiling oils, the distillation may be simplified.

The foregoing examples are concerned with processes carried out without making any provision for removing the aluminum halide by-product from the zone of reaction. While the process is operative to produce good yields under the conditions described, it is preferred to remove the aluminum halide from the zone of vigorous reaction substantially as soon as formed while at the same time subjecting the reaction mixture to agitation. Accordingly, the process will now be described in connection with this manner of proceeding. By operating in this way the process can be carried out continuously, although the procedure can also be employed in batch operations.

This will be described in connection with the accompanying drawing in which the single figure is a diagrammatic view, partly in section, of a suitable apparatus for use in operating the process. The process will be described as applied to the reaction between methyl aluminum chloride and 2-chloro-2,3-dimethylbutane.

Referring to the drawing, the reaction vessel 10 is maintained substantially full of a reaction mixture in which the methyl aluminum chloride is present in excess of the theoretical amount required for reaction with the 2-chloro-2,3-dimethylbutane. The methyl aluminum chloride is passed through a pipe 12 to a cooler 14 where it is cooled to the desired reaction temperature between −50° C. and 0° C. The cooled liquid is then passed through valved line 16 leading through the top of the reaction vessel. The 2-chloro-2,3-dimethylbutane, preferably in solution in a paraffinic hydrocarbon liquid boiling at least about 100° C., is passed through line 18, cooler 22, and valved line 24 and preferably enters the reaction vessel at about the same temperature as the methyl aluminum chloride.

As shown, the reaction vessel comprises two sections or zones. The upper zone 26 has a relatively large cross-section and in it the reaction mixture is subjected to vigorous agitation. This is accomplished by means of a stirrer 28 mounted on a shaft 32 which is rotated through a pulley 34 by a source of power not shown. The lower zone 36 is a quiescent zone wherein the mixture is permitted to react and wherein the aluminum chloride by-product is permitted to settle from the mixture. The reaction vessel is provided with a cooling jacket 38 of conventional type in which a cooling fluid such as brine may be circulated. The bottom 42 of the reaction vessel is preferably bowl-shaped so as to cause the settled aluminum chloride to move towards the center from which the aluminum chloride and other solid impurities can be removed, preferably periodically, through a pipe 44 provided with a valve 46. The pipe 44 leads to a collecting vessel 48. This vessel may be emptied periodically through valved line 52. Leading from the side of the reaction vessel in the lower portion of the quiescent zone but substantially above the bottom is a pipe 54 provided with a valve 56, through which the desired reaction product is removed.

Returning to the description of the process, as the methyl aluminum chloride and the 2-chloro-2,3-dimethylbutane are introduced at a rate such as to maintain the methyl aluminum chloride in excess, these materials react vigorously in the upper zone 26, forming 2,2,3-trimethylbutane and aluminum chloride. The aluminum chloride, being a solid, settles from this zone, through the quiescent zone 36, and to the bottom of the vessel. Thus, it is removed from the zones of reaction and the agitation in the upper zone does not bring the settled material back into contact with the reaction mixture. The product is removed from the vessel through line 54 and is fractionated to recover the 2,2,3-trimethylbutane. Because of the difference in boiling points, the fractionation may be carried out so as to maintain the solvent substantially in the liquid phase, and the solvent may be employed again in the process.

Obviously many modifications and variations of the invention, as hereinbefore set forth, may be made without departing from the spirit and scope thereof, but only such limitations should be imposed as are indicated in the appended claims.

I claim:

1. The process of preparing an alkylated aliphatic compound which comprises reacting an alkyl aluminum halide with an aliphatic halide in a reaction mixture in which the reactive materials consist essentially of said alkyl aluminum halide and said aliphatic halide to replace a halogen of said aliphatic halide with an alkyl radical of said alkyl aluminum halide.

2. A process in accordance with claim 1 in which the reaction mixture is maintained at a temperature between about −50° and 0° C.

3. A process in accordance with claim 1 in which the reaction mixture also contains as a solvent a saturated hydrocarbon liquid.

4. A process in accordance with claim 1 in which an excess of the alkyl aluminum halide is maintained in the reaction mixture.

5. A process in accordance with claim 1 in which said alkyl aluminum halide is a methyl aluminum halide.

6. The process of preparing a methylated aliphatic hydrocarbon which comprises reacting a methyl aluminum chloride with an alkyl halide in a reaction mixture in which the reactive materials consist essentially of said methyl aluminum chloride and said alkyl halide to replace a halogen of said alkyl halide with a methyl radical of said methyl aluminum chloride.

7. A process in accordance with claim 6 in which the reaction mixture is maintained at a temperature between about −50° C. and 0° C.

8. A process in accordance with claim 6 in which an excess of the methyl aluminum chloride is maintained in the reaction mixture.

9. A process in accordance with claim 6 in which the alkyl halide in solution in a paraffinic hydrocarbon solvent is added to the methyl aluminum chloride.

10. A process in accordance with claim 6 in which the alkyl halide is a tertiary alkyl halide.

11. The process of preparing 2,2,3-trimethylbutane which comprises reacting methyl aluminum chloride with 2-chloro-2,3-dimethylbutane in a reaction mixture in which the reactive materials consist essentially of said methyl aluminum chloride and said 2-chloro-2,3-dimethylbutane to replace the chlorine in said 2-chloro-2,3-dimethylbutane with a methyl radical of said methyl aluminum chloride.

12. The process of preparing 2,2,3-trimethylbutane which comprises reacting methyl aluminum chloride with 2-chloro-2,3,-dimethylbutane in a reaction mixture in which the reactive materials consist essentially of said methyl aluminum chloride and said 2-chloro-2,3-dimethylbutane to replace the chlorine in said 2-chloro-2,3-dimethylbutane with a methyl radical of said methyl aluminum chloride, said reaction mixture being maintained at a temperature between about −50° and 0° C.

13. The process of preparing 2,2,3-trimethylbutane which comprises adding a solution of 2-chloro-2,3-dimethylbutane in a saturated hydrocarbon liquid to a reaction mixture containing methyl aluminum chloride and being free from other reactive materials, the addition of said solution being controlled to maintain an excess of said methyl aluminum chloride in said reaction mixture, said reaction mixture being maintained at a temperature between about −50° and 0° C., whereby the chlorine atom of said 2-chloro-2,3-dimethylbutane is replaced by a methyl radical of said methyl aluminum chloride.

14. The process of preparing an alkylated aliphatic compound which comprises reacting an alkyl aluminum halide with an aliphatic halide in a reaction mixture in which the reactive materials consist essentially of said alkyl aluminum halide and said aliphatic halide, to replace a halogen of said aliphatic halide with an alkyl radical of said alkyl aluminum halide and form an aluminum halide as a by-product, and withdrawing said aluminum halide from said reaction mixture substantially as rapidly as formed.

15. The process of preparing a methylated aliphatic compound which comprises reacting methyl aluminum chloride with a tertiary alkyl chloride in a reaction mixture in which the reactive materials consist essentially of said methyl aluminum chloride and said tertiary alkyl chloride, to replace chlorine of said tertiary alkyl chloride with a methyl radical of said methyl aluminum chloride and form aluminum chloride as a by-product, and withdrawing said aluminum chloride from said reaction mixture substantially as rapidly as formed.

16. In the process of preparing an alykylated aliphatic compound wherein an alkyl aluminum halide is reacted with an aliphatic halide in a reaction mixture in which the reactive materials consist essentially of said alkyl aluminum halide and said aliphatic halide to produce a reaction product resulting from the replacement of a halogen of said aliphatic halide with an alkyl radical of said alkyl aluminum halide and yield an aluminum halide as a by-product, the method which comprises passing said reaction mixture successively downwardly through a zone of agitation and a substantially quiescent zone, said zones being in contact with cooling means to maintain the reaction mixture at a low temperature, at least the major part of the reaction between said alkyl aluminum halide and said aliphatic halide taking place in said zone of agitation and said aluminum halide settling out of said reaction mixture in said zone of agitation substantially as rapidly as formed, and removing said reaction product from said substantially quiescent zone.

17. In the process of preparing a methylated aliphatic compound wherein methyl aluminum chloride is reacted with a tertiary alkyl chloride in a reaction mixture in which the reactive materials consist essentially of said methyl aluminum chloride and said tertiary alkyl chloride to produce a reaction product resulting from the replacement of chlorine of said tertiary alkyl chloride with a methyl radical of said methyl aluminum chloride and yield aluminum chloride as a by-product, the method which comprises passing said reaction mixture successively downwardly through a zone of agitation and a substantially quiescent zone, said zones being in contact with cooling means to maintain the reaction mixture at a temperature between about $-50°$ C. and $0°$ C., at least the major part of the reaction between said methyl aluminum chloride and said tertiary alkyl chloride taking place in said zone of agitation and said aluminum chloride settling out of said reaction mixture in said zone of agitation substantially as rapidly as formed, and removing said reaction product from said substantially quiescent zone.

ROBERT THOMAS SANDERSON.